US007692647B2

(12) United States Patent
Lin et al.

(10) Patent No.: US 7,692,647 B2
(45) Date of Patent: Apr. 6, 2010

(54) REAL-TIME RENDERING OF REALISTIC RAIN

(75) Inventors: Zhouchen Lin, Beijing (CN); Lifeng Wang, Beijing (CN); Tian Fang, Guangzhou (CN); Xu Yang, Beijing (CN); Xuan Yu, Beijing (CN); Jian Wang, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 11/532,052

(22) Filed: Sep. 14, 2006

(65) Prior Publication Data

US 2008/0068386 A1 Mar. 20, 2008

(51) Int. Cl.
| G06T 15/00 | (2006.01) |
| G06T 15/50 | (2006.01) |
| G06T 15/60 | (2006.01) |
| G06T 15/70 | (2006.01) |
| G06T 13/00 | (2006.01) |
| G09G 5/02 | (2006.01) |
| G09G 5/10 | (2006.01) |

(52) U.S. Cl. .................. 345/419; 345/426; 345/473; 345/589; 345/629; 345/632

(58) Field of Classification Search ................. 345/419, 345/426, 473, 589, 592, 629, 632
See application file for complete search history.

(56) References Cited

U.S. PATENT DOCUMENTS 4,313,726 A 2/1982 Chase
5,379,215 A 1/1995 Kruhoeffer et al.
5,535,374 A 7/1996 Olive
5,583,972 A 12/1996 Miller
5,594,850 A * 1/1997 Noyama et al. ............. 345/632
5,926,401 A 7/1999 Montag et al.
6,348,924 B1 * 2/2002 Brinsmead .................. 345/441
6,359,624 B1 * 3/2002 Kunimatsu ................. 345/503
6,377,269 B1 * 4/2002 Kay et al. ................... 345/589
6,628,298 B1 * 9/2003 Debevec .................... 345/632
6,683,609 B1 1/2004 Baron, Sr. et al.
6,700,588 B1 * 3/2004 MacInnis et al. ............ 345/629
6,985,148 B2 1/2006 Liang et al.
7,038,694 B1 * 5/2006 Santodomingo et al. .... 345/582
7,538,766 B2 * 5/2009 Zhou et al. .................. 345/426
2003/0179197 A1 * 9/2003 Sloan et al. ................. 345/426
2005/0043917 A1 2/2005 Dahlen et al.
2005/0088440 A1 * 4/2005 Sloan et al. ................. 345/426

(Continued)

OTHER PUBLICATIONS

Kshitiz Garg & Shree K. Nayar, Photorealistic Rendering of Rain Streaks, Jul. 2006, ACM Transactions on Graphics (TOG), vol. 25, p. 996-1002.*

(Continued)

*Primary Examiner*—Ulka Chauhan
*Assistant Examiner*—Roberta Prendergast
(74) *Attorney, Agent, or Firm*—Lee & Hayes, PLLC

(57) ABSTRACT

Real-time rendering of realistic rain is described. In one aspect, image samples of real rain and associated information are automatically modeled in real-time to generate synthetic rain particles in view of respective scene radiances of target video content frames. The synthetic rain particles are rendered in real-time using pre-computed radiance transfer with uniform random distribution across respective frames of the target video content.

17 Claims, 5 Drawing Sheets

U.S. PATENT DOCUMENTS

| | | | |
|---|---|---|---|
| 2005/0104883 | A1 | 5/2005 | Snyder et al. |
| 2005/0171754 | A1* | 8/2005 | Santodomingo et al. ...... 703/21 |
| 2005/0219249 | A1* | 10/2005 | Xie et al. .................... 345/473 |

OTHER PUBLICATIONS

Pierre Rousseau, Vincent Jolivet, & Djamchid Ghazanfarpour, Realistic real-time Rain Rendering, Aug. 2006 (Available online Jun. 12, 2006), Computers & Graphics, vol. 30, p. 507-518.*

Zhong-Xin Feng; Min Tang; Jin-Xiang Dong; Shang-Ching Chou, "Real-time rendering of raining animation based on the graphics hardware acceleration," Proceedings of the Ninth International Conference on Computer Supported Cooperative Work in Design, 2005., vol. 2, pp. 734-739, May 2005.*

Garg, K., Shree, K.N.: "Photometric model of a rain drop", Technical Report, Computer Science Department, Columbia University, Sep. 2004.*

K. Garg and S.K. Nayar., "Detection and removal of rain from videos", Proceedings of CVPR 2004, vol. 1, pp. 528-535, Jun. 27-Jul. 2, 2004.*

K. Garg and S.K. Nayar., "When does a camera see rain?", Proceedings of ICCV 2005, vol. 2, pp. 1067-1074, Oct. 17-21, 2005.*

Kolb A, Latta L, Rezk-Salama C., "Hardware-based simulation and collision detection for large particle systems", Proceedings ACM SIGGRAPH/EUROGRAPHICS conference on graphics hardware, HWWS '04, New York, NY, ACM Press; Jul. 2004. p. 123-31.*

Kristensen, A. W., Akenine-Möller, T., and Jensen, H. W., "Precomputed local radiance transfer for real-time lighting design", ACM SIGGRAPH 2005 Papers, Jul. 31-Aug. 4, 2005, J. Marks, Ed. SIGGRAPH '05. ACM, New York, NY, pp. 1208-1215.*

Langer, M. S., Zhang, L., Klein, A., Bhatia, A., Pereira, J., Rekhi, D., (Jun. 2004), "A spectral-particle hybrid method for rendering falling Snow", Eurographics symposium on rendering, 10 pages.*

Lutz Latta, (2004), "Building a Million Particle System", Game Developers Conference, San Jose, Mar. 2004, pp. 1-16.*

Matusik, et al., "Acquisition and rendering of transparent and refractive objects", Proceedings of the 13th Eurographics Workshop on Rendering, Pisa, Italy, Jun. 26-28, 2002, S. Gibson and P. Debevec, Eds., ACM International Conference Proceeding Series, vol. 28, Eurographics Association, Aire-la-Ville, Switzerland, pp. 267-278.*

Persson et al., "Real-time fluid simulations based on a meta-particle system", ITN, Linköping University, TNM052-Modeling and Animation, May 30, 2003, 20 pages, http://staffwww.itn.liu.se/~petbi/mt_projects/mna/modeling_and_animation.pdf.*

Reeves, W. T., "Particle systems—a technique for modeling a class of fuzzy objects", SIGGRAPH Computer Graphics, vol. 17, Issue 3, Jul. 1983, pp. 359-375.*

Sims K., "Particle animation and rendering using data parallel computation", Proceedings of the 17th annual conference on Computer graphics and interactive techniques, Aug. 1990, ACM Press, pp. 405-413.*

Sloan, et al., "Precomputed radiance transfer for real-time rendering in dynamic, low-frequency lighting environments", Proceedings of the 29th Annual Conference on Computer Graphics and interactive Techniques, Jul. 23-26, 2002, SIGGRAPH '02. ACM, New York, NY, pp. 527-536.*

S. Starik and M. Werman., "Simulation of rain in video", Proceedings of the 3rd Int'l Workshop on Texture Analysis and Synthesis, pp. 95-100, Oct. 17, 2003.*

Tatarchuk, N.I.J., "Artist-directable real-time rain rendering in city environments", Proceedings of the Conference on SIGGRAPH 2006 Course Notes, pp. 29-70. ACM press, Jul. 30-Aug. 3, 2006.*

Wang, L.F., Lin, Z.C., Fong, T. et al.: "Real-time rendering of realistic rain", Technical Report MSR-TR-2006-102, Microsoft Research, Microsoft Corporation, Jul. 2006, 19 pages.*

Wei, et al., "Simulating fire with texture splats", Proceedings of the Conference on Visualization '02, Oct. 27-Nov. 1, 2002, Visualization, IEEE Computer Society, Washington, DC, pp. 227-235.*

Wexler, et al., "Image-based environment matting", Proceedings of the 13th Eurographics Workshop on Rendering, Jun. 26-28, 2002, S. Gibson and P. Debevec, Eds., ACM International Conference Proceeding Series, vol. 28. Eurographics Association, Aire-la-Ville, Switzerland, pp. 279-290.*

Zongker, et al., 1999. "Environment matting and compositing", Proceedings of the 26th Annual Conference on Computer Graphics and interactive Techniques, SIGGRAPH '99, ACM Press/Addison-Wesley Publishing Co., New York, NY, Aug. 1999, pp. 205-214.*

Chen, et al., "Real-time fluid simulation in a dynamic virtual environment", IEEE Computer Graphics and Applications, vol. 17, No. 3, 1997, pp. 52-61, Abstract printed from website: http://md1.csa.com/partners/viewrecord.php?requester=gs&collection=TRD&recid=02828..., printed on Apr. 24, 2006, 1 page.

Riley, et al., "A System for Realistic Weather Rendering", MSEE 274, 8.14, 7 pages.

Trembilski, "Two Methods for cloud visualisation from weather simulation data", The Visual Computer, vol. 17, No. 3, May 2001, pp. 179-184, Abstract printed from website: http://www.springerlink.com/(0yfwpxv1twfnbq45mfym5d55)/app/home/contribution.asp?..., printed on Apr. 24, 2006, 1 page.

Yang, et al., "Real-Time Simulation: Water Droplets on Glass Windows", Computing in Science & Engineering, IEEE, Jul./Aug. 2004, pp. 69-73.

* cited by examiner

REAL-TIME RENDERING OF REALISTIC RAIN

BACKGROUND

Adding simulated rain to rendered scenes can add realism to the scenes. During video capture operations, a scene with rain may be inadvertently or improperly captured with unintended and undesirable results. In such a scenario, the ability to effectively simulate rain in post-production operations would be useful. Conventional techniques to add simulated rain to video content typically involve manually designing rain drops/strokes to add to a scene. However, such manual design operations are tedious and time consuming. Additionally, designing rain strokes manually generally results in simulated rain strokes that do not appear natural or sufficiently varied across scenes in a video sequence.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

Real-time rendering of realistic rain is described. In one aspect, image samples of actual rain and associated information are automatically modeled in real time to generate synthetic rain particles in view of respective scene radiances of target video content frames. The synthetic rain particles are rendered in real-time using pre-computed radiance transfer with uniform random distribution across respective frames of the target video content.

BRIEF DESCRIPTION OF THE DRAWINGS

In the Figures, the left-most digit of a component reference number identifies the particular Figure in which the component first appears.

DETAILED DESCRIPTION

Overview

Systems and methods for real-time rendering of realistic rain are described with respect to FIGS. 1 through 5. More particularly, the systems and methods randomly select real rain stroke samples extracted from video content to model as synthetic rain particles. Using a commodity graphics accelerator, and taking respective scene radiances into consideration, the systems and methods implement operations to synthesize rain in real-time from the particles for rendering. These operations include rendering the synthetic rain across scenes (e.g., image frames from synthetic 3D scenes, real videos, etc.) with uniform random distribution, controllable velocity, and color determined via pre-computed radiance transfer (PRT).

An Exemplary System

Although not required, real-time rendering of realistic rain is described in the general context of computer-executable instructions (program modules) being executed by computing devices such as a general-purpose computer or a mobile handheld device. Program modules generally include routines, programs, objects, components, data structures, etc., that perform particular tasks or implement particular abstract data types. While real-time rendering of realistic rain is described in the foregoing context, acts and operations described hereinafter may also be implemented in hardware.

Figure 1:
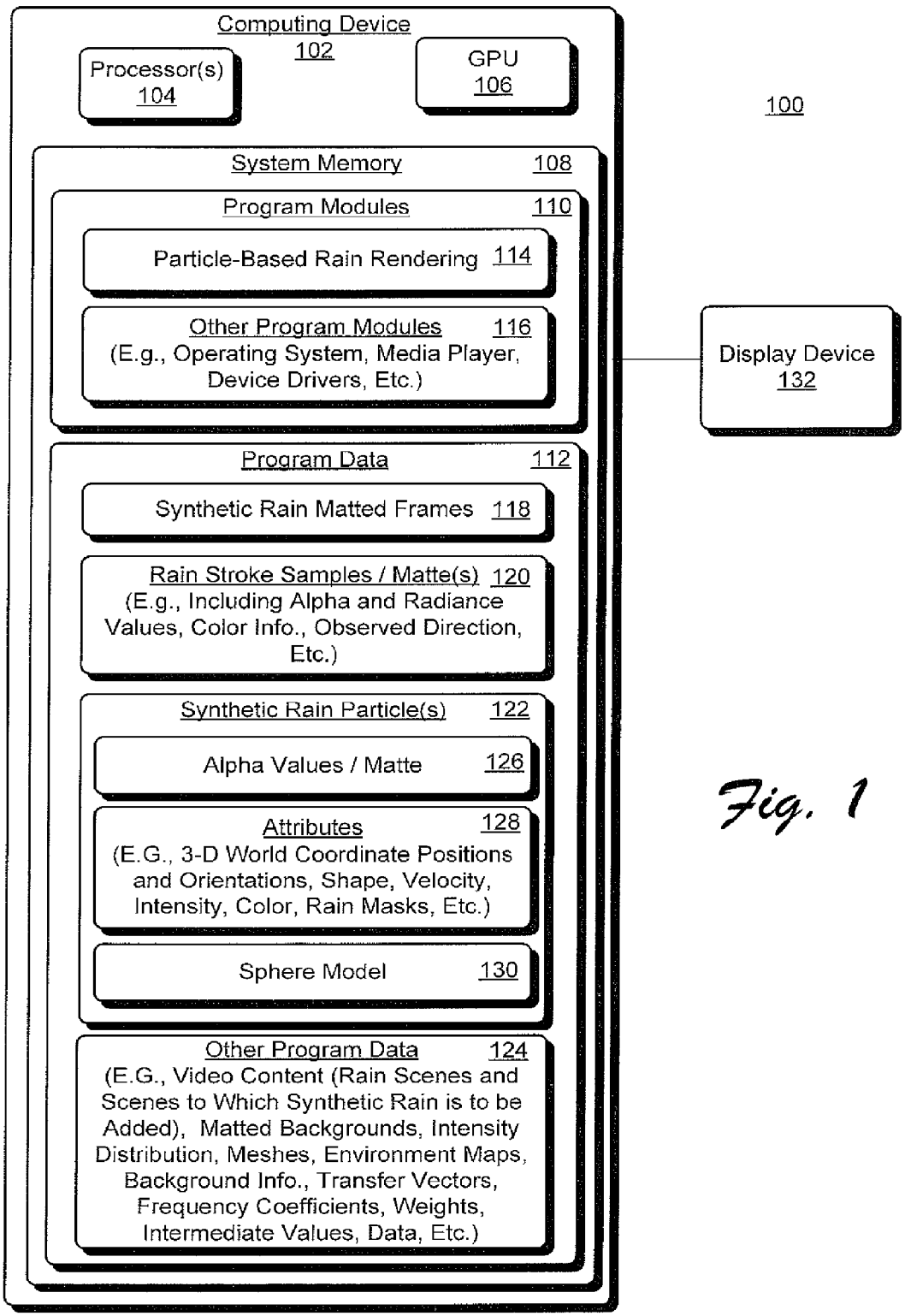
FIG. 1 shows an exemplary system for real-time rendering of realistic rain, according to one embodiment.

FIG. 1 shows an exemplary system 100 for real-time rendering of realistic rain, according to one embodiment. System 100 includes the computing device 102 and display device 132. Computing device 102 includes processor 104 and a graphics processing unit 106, which is hereinafter often referred to as a "GPU" (or graphics accelerator), coupled to system memory 108. System memory 108 includes program modules 110 and program data 112. In this implementation, program modules 110 include, for example, particle-based rain rendering module 114 ("rendering module 144") and other program modules 116 such as an operating system (OS) to provide a runtime environment, a media player to present image frames of video content, device drivers, and/or so on.

Rendering module 114 uses static images of real rain for real-time modeling and rendering of particle-based synthetic rain into video content to generate respective synthetic rain matted frames 118. More particularly, rendering module 114 analyzes video content offline (i.e., not in real-time) to extract samples of real rain of various sizes and shapes. These extracted samples are shown as rain stroke samples/mattes 120. Each rain stroke sample 120 is a sample of actual rain stroke with alpha values defining opacity of the object, radiance values for every pixel of the rain stroke, observed rain stroke direction and color (including color of a static background of the frame). Rendering module 114 randomly selects a set of rain stroke samples 120 to model into synthetic rain particles 122, which are hereinafter often referred to as "rain particles", "particles", "synthetic rain", "raindrops" or "rain strokes". In real-time, rendering module 114 models and renders the rain particles 122 to generate synthetic rain matted frames 118 for presentation to a user.

Specifically, for each frame of a sequence of video content to which synthesized rain is to be added (i.e., target video content frames), and for each particle 122 of multiple rain particles 122, rendering module 114:

Uses vertex shader logic of a graphics processing unit (GPU) 106 to convert position and orientation of alpha values of a rain stroke sample matte 118 associated with the particle 122 into 3-D world coordinate space of the frame. For purposes of exemplary illustration, such alpha values are shown in particle 122 as "alpha values 126" or "alpha matte 126"; identified 3-D world coordinate positions and orientations associated with the alpha values/matte 126 are shown as a respective portion of attributes 128.

Computes current velocity, position, and shape attributes associated with the particle 122 based on the particle's previous velocity, position, and shape. Such attributes are shown as respective portions of attributes 128.

Calculates from a non-shaded rain mask that identifies parts of the frame that will be shaded by the alpha matte 126 using the logic of GPU 106 (GPU 106 automatically knows which area to shade from the position of the rain mask provided by the vertex shader).

Determines color and intensity of each rain particle 122 in view of the corresponding non-shaded rain mask using per-pixel shader operations of GPU 106 and pre-computed radiance transfer (PRT) to generate a respective shaded rain mask for the alpha matte 126. For purposes of exemplary illustration, such non-shaded and shaded rain masks are collectively shown as "rain masks" in a respective portion of attributes 128.

Alpha-blends, using CPU 106, each modeled rain particle's oriented and positioned alpha matte 126 and respective shaded rain mask with detected background color of the frame to generate the final synthetic rain matted frame 118.

Renders the synthetic rain matted frame 118 for presentation to a user.

These and other aspects of system 100 for real-time rendering of realistic rain are now described in greater detail.

Extracting Rain Stroke Samples from a Static Scene of Actual Rain

Rendering module 114 analyzes a sequence of image frames associated with video content (rain videos) to extract various shapes of rain stroke/drop samples 120 from respective ones of the image frames. For purposes of exemplary illustration, such analyzed video content is shown as a respective portion of "other program data" 124. Each rain stroke sample 120 is a sample of actual rain stroke with alpha values defining opacity of the object, radiance values for every pixel of the rain stroke, observed rain stroke direction and color (including color of a static background of the frame). In one implementation, rain stroke samples 120 form a library of real/actual rain samples.

If video content used for analysis and rain stroke sample 120 extraction is not captured using a high-speed camcorder, or other digital image capture device, the rain in successive frames is essentially independent. In other words, positions of rain strokes in successive video frames are not correlated. The positions can be totally different. Conventional techniques to detect rain (e.g., via independent pixel-by-pixel use of a median filter) do not consider: (1) rain is globally directional; and, (2) a typical scene has a mostly continuous color distribution. As a result, such conventional techniques are susceptible to image noise that degrades quality of detected rain. In contrast rendering module 114 addresses the globally directional characteristics of rain and substantially continuous scene color distribution when detecting rain strokes for extraction and archiving as rain stroke samples 120.

Specifically, rendering module 114 implements rain extraction as a nonlinear least-squares problem, as follows:

$$(S, \alpha) = \underset{S,\alpha}{\operatorname{argmin}} \sum_{i,j,k} (I_{i,j}^k - (1 - \alpha_i^k) S_{i,j} - \alpha_i^k C_j)^2 + \lambda \sum_{i,j} \|\nabla S_{i,j}\|^2 + \mu \sum_{i,k} (\nabla \alpha_i^k \cdot D_0)^2 \quad (1)$$

Indices i, j, and k reference pixels, color channels, and frames, respectively. Parameter I is an observed color, $\alpha$ is a fractional blending weight due to rain, S is a color of a static background, $(C_R, C_G, C_B)$ is a "color" of the rain (e.g., due to environmental factors, etc.), $D_0$ is a principal rain direction, and $\lambda$ and $\mu$ are weights.

The first term in (1), \sum_{i,j,k}, assumes the observed color is a linear blend of the colors of a scene and rain. The second term (\sum_{i,j}) encourages smoothness in the scene color distribution, while the third term (\sum_{i,k}) favors smoothness of the alpha distribution along the rain direction $D_0$. Rendering module 114 solves for $\alpha$ and S alternately using an Expectation-Maximization (EM) algorithm. Rendering module 114 utilizes a median filtered version of S is used to initialize S, whereas rain direction $D_0$ is initialized as the vertical direction. Rendering module 114 refines rain direction $D_0$ immediately after estimating $\alpha$ by detecting a most salient line in a frequency spectrum of $\alpha$ that passes through an origin.

Once rendering module 114 determines rain direction $D_0$ rendering module 114 rotates the rain strokes to make them practically vertical. To reduce artifacts caused by not fully modeling the rain (e.g., inter-reflection effects), rendering module 114 applies morphological erosion and dilation followed by vertical blurring. In practice, these operations are sufficient to produce plausible shapes of rain strokes (i.e., rain stroke samples 120).

Exemplary Modeling/Rain Synthesis Operations

For each image frame (i.e., a static scene) of a target video content sequence, rendering module 114 independently models at least a subset of these rain stroke samples 120 as rain particles 122. In one implementation, rendering module 114 randomly selects the particular rain stroke samples 120 to utilize as rain particles 122 ("particles 122"). For purposes of exemplary illustration, such a target video content sequence is shown as a respective portion of "other program data" 124. Rendering module 114 independently models each particle 122 with respect to a frame (e.g., frame coordinate system, viewpoint, background content and color, etc.) of the target video content sequence, with position (based on uniform or non-uniform distribution criteria), controlled and configurable velocity (based on physical laws), and shape (based at least on current particle velocity).

For example, and in one implementation on a frame-by-frame basis, rendering module 114 uses vertex shader logic of GPU 106 to model alpha values 126 (alpha mattes) of the rain stroke samples 120 associated with respective ones of the particles 122 in real-time as particles in 3-D world coordinate space of respective image frames. In one implementation, rendering module 114 models position of each particle 122 in frame space as a uniform random variable. In another implementation, density distribution of particles 122 across a frame is based on geometry of a scene depicted by the frame. For a real scene and arbitrary camera motion, structure from motion techniques is applied to extract scene depth. When there is no motion parallax (e.g., for a panning camera or flat scene), approximate depth is manually assigned.

Rendering module 114 determines respective velocities of particles 122 in real-time using a basic physical law, as follows: $v=v_0+gt$, where g is the gravity acceleration and t is the time from the moment that the velocity of raindrop is $v_0$. Current velocity is $v=v=v_0+gt$, where t is the time from the moment that the velocity of raindrop is $v_0$. Velocity changes over time. Once the initial position and velocity of a raindrop (i.e., an alpha matte 126) is randomly generated, the movement of the raindrop in the world coordinate (i.e. the 3D scene) across respective frames of video content follows this physical law. In one implementation, velocity and magnitude of a rain particle 122 is user configurable.

With respect to shape, rendering module 114, for each particle 122, models each alpha matte 126 of the particle as a sphere. In this implementation, the size of the sphere is no significant, since original size of an alpha matte 126 is typically much smaller than a scene associated with a frame of video content. Rendering module 113 determines length of a rain sample matte 120 (associated with a respective particle 122) based on a particle's current velocity and the exposure time of a virtual camera (a user controllable parameter). Rendering module 114 generates rain stroke sample 120 shape by shrinking or stretching its original shape, accordingly, through interpolation. For example, suppose original rain stroke matte samples 120 were taken by a camera with exposure time $t_0$, the rain velocity was $v_0$, and in the novel scene of a video sequence: velocity of a raindrop is assumed to be $v_1$, and exposure time of a virtual camera is assumed to be $t_1$. In view of this, length of the rain stroke matte 120 is scaled by $v_1 t_1 / v_0 t_0$ times, the alpha values 126 are interpolated accordingly. The diameter of the sphere 130 that models the particle 122 corresponds to the width of the alpha matte 126 after being mapped to coordinates associated with a frame.

In one implementation, and to illustrate influence of wind, rendering module 114 applies a wind model to a particle 122 to dynamically deform shape of the corresponding rain stroke sample 120.

Rendering module 114 uses GPU 106 to identify portion(s) of a scene in a frame for shading. To this end, GPU 106 generates a respective rain mask for each alpha matte 126 associated with rain particles 122. (A rain mask is a binary mask where in side the rain matte the value is 1 and outside the rain matte the value is 0). For each rain mask, rendering module 114 utilizes per-pixel shader logic of GPU 106 to compute color and intensity (attributes 128) of each particle 122. Specifically the per-pixel shader determines color and intensity of light reflected towards a viewing direction at each point in the rain mask via pre-computed radiance transfer (PRT) to generate respective shaded rain masks. For purposes of exemplary illustration, such rain masks (non-shaded and shaded) are shown as respective portions of attributes 128. System 100 assumes that there is no inter-reflection among the particles 122 (raindrops), so every raindrop is affected only by the environment map. The PRT consists of two parts: an environment map and a transfer function of a sphere model 130 associated with each particle 122.

Video content representing a real scene may not provide a complete environment map. In one implementation, rendering module 114 fills-in missing parts/generates an environment map using nearest available colors. In one implementation, a horizontal field of view in an environment map is approximately 36°. In one implementation, for video content generated by a panning camera, rendering module 114 stitches frames of the video content into a panorama, and thereby, provides wider coverage for the environment map. In one implementation, for a looming camera, rendering module 114 stitches a panorama every five frames to produce a view dependent environment map. Pixel values of a scene, particularly values associated with light sources, are of low dynamic range and may not cause noticeable effects on the rain. Because of this, rendering module 114 replaces saturated values with measured radiance of the light sources (measured when video content is captured).

In one implementation, to add realism to a rain scene 118, rendering module 114 adds homogenous fog. Rain strokes are visible in the video only when they are close enough to the camera. When the rain strokes are far away, it has the appearance of fog. In this scenario, an alpha matte of the fog is exponentially decreasing with respect to depth d; i.e., $\alpha_{fog} = 1 - \exp(\epsilon d)$, where $\epsilon$ is the fog density. In one implementation, values of $\epsilon$ between 1.35 and 1.8 are used, although other values could also be used.

Transfer Function of Sphere Model

Figure 2:
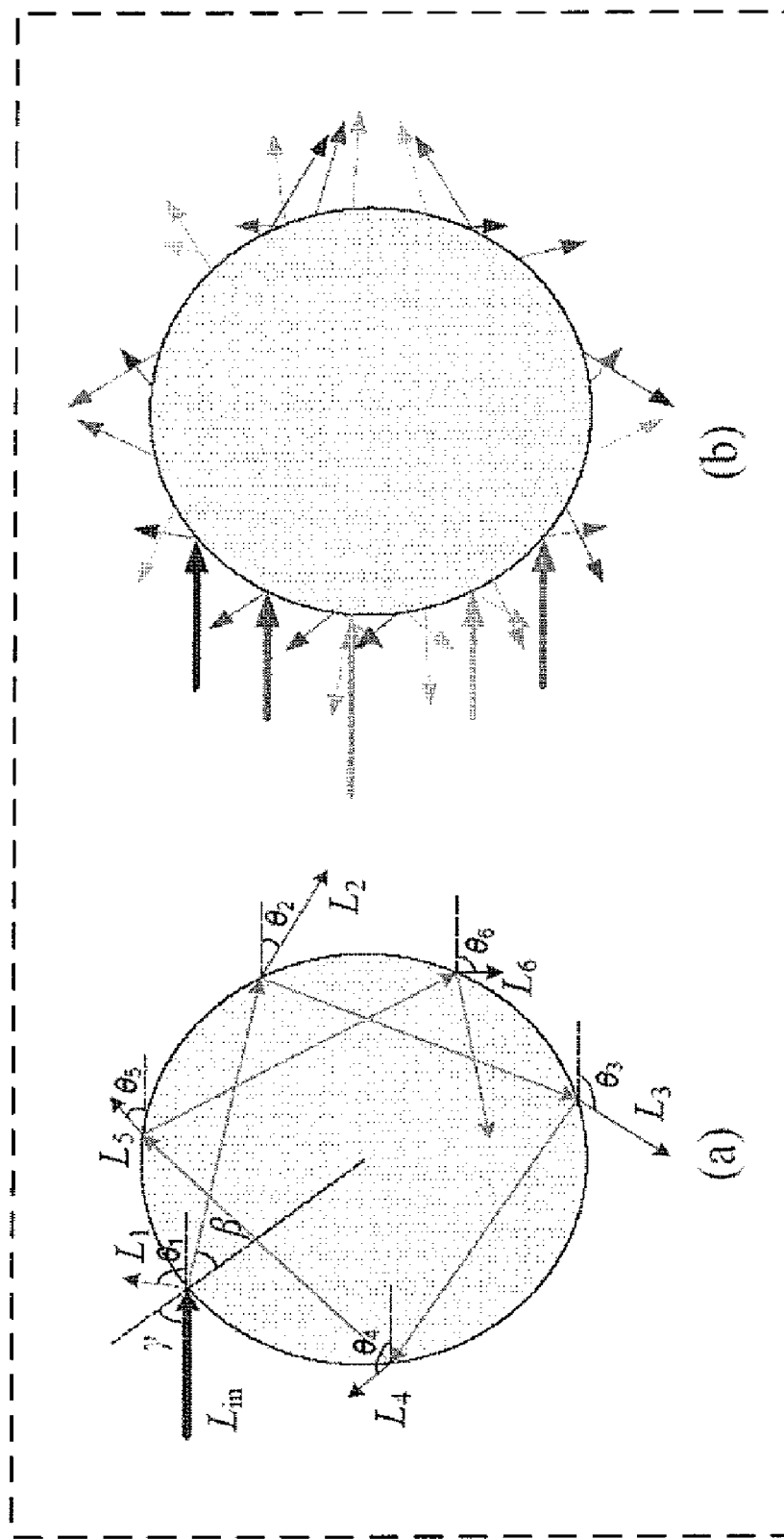
FIG. 2 shows an exemplary sphere model for illustrating raindrop reflection and refraction of light, according to one embodiment.

To use PRT, rendering module 114 computes a transfer function of a sphere model 130 for each particle 122. The transfer function weights an environment map to produce light intensity reflected towards a viewing direction. Direct computation is difficult. To address this in view of reversibility of light, and in one implementation, rendering module 114 computes an outgoing light intensity distribution function by tracing the light in the viewing direction to determine how the light is scattered toward various directions, as shown in FIG. 2. This function is identical to the transfer function.

FIG. 2 shows an exemplary sphere model with a refractive index of water for illustrating raindrop reflection and refraction of light, according to one embodiment. Such a sphere model is representative of one embodiment of a sphere model 130 of FIG. 1. Referring to FIG. 2, sphere (a) illustrates reflection and refraction of light after hitting a raindrop. In this example, $L_{in}$ represents incident light, which will be scattered by the raindrop toward different directions $L_1$, $L_2$, . . . . Sphere (b) illustrates that for incoming light rays (shown as thick directional lines pointing towards the sphere); corresponding outgoing rays (shown as thin arrowed lines with corresponding colors pointing away from sphere) are then computed. In this example, five different incoming light rays are shown, although it can be appreciated that there can be different numbers of incoming light rays. Due to a reversibility characteristic of light, a raindrop transfer function is identical to the outgoing light intensity distribution function.

To simplify this derivation, rendering module 114 uses sphere model 130 to model a rain stroke sample 120 (and corresponding alpha values 126) associated with a particle 122 as a sphere. Size of the sphere is inconsequential since it the raindrop being modeled is typically much smaller than the scene. Using principles of basic optics (please see Appendix A), rendering module 114 derives a closed-form solution for the outgoing light distribution function $D(\theta, \phi)$ for the spherical raindrop model (please see Appendices B and C). $\theta$ and $\phi$ are the angles associated with the altitude and azimuth, respectively, with (0,0) aligning with the z-axis (see FIG. 2(a) for visualization of $\theta$). Because light is invertible, the transfer function $F(\theta, \phi)$ is identical to the outgoing light intensity distribution function $D(\theta, \phi)$.

Figure 3:
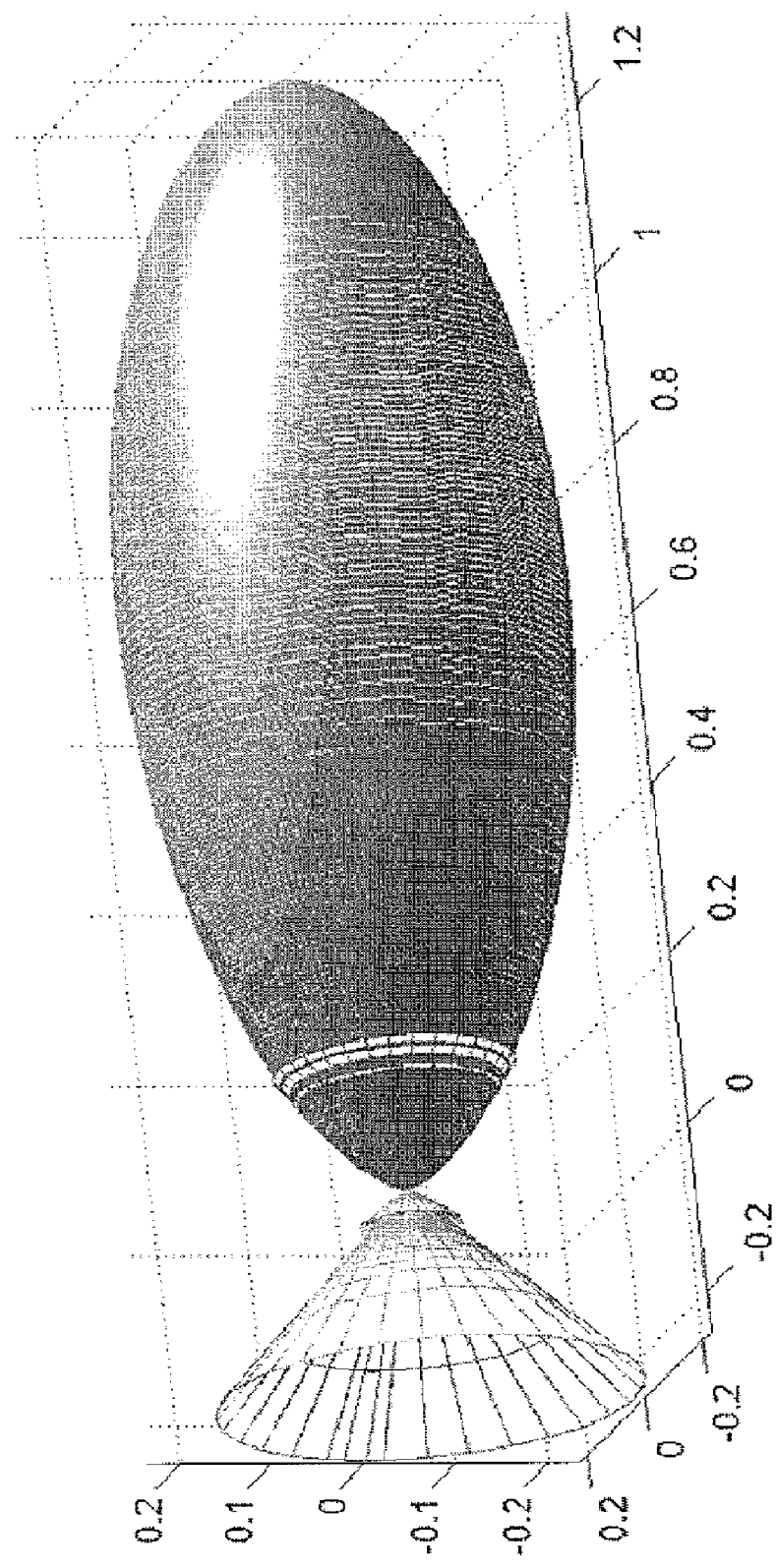
FIG. 3 shows an exemplary 3D shape of a transfer function for a raindrop viewed from left to right along a major raindrop axis, according to one embodiment.

FIG. 3 shows an exemplary 3D shape of a transfer function $F(\theta, \phi)$ for a raindrop (as modeled by a particle 122 of FIG. 1) when viewed from left to right along a major axis of the raindrop, according to one embodiment. More particularly, FIG. 3 shows an exemplary 3D shape of transfer function $F(\theta, \phi)$ for a raindrop when viewed from direction (0, 0). Direction (0,0) is from left to right along the major axis of the shape. The singular point (0, 0, 0) corresponds to raindrop location. The transfer function $F(\theta, \phi)$, shown in FIG. 3, is rotationally symmetric with respect to the azimuth angle $\phi$. The part of the environment map corresponding to the viewing direction contributes the most to the radiance of the raindrop. There are some bumps in the transfer function. Such bumps are due to discontinuity of light reflection when incident angle of light reaches some critical angles. Note that parts of an environment map closer to a camera contribute to the radiance of the raindrop. Since a raindrop is modeled as a sphere, the transfer function ((7) of Appendix C) differs only by a rotation for viewing directions other than (0,0). Since the transfer function is closed-form, ray tracing is not needed for its computation. Moreover, as the transfer function in a different viewing direction differs only by a rotation, it is adequate to store just the 1-D transfer vector $f_{00}$ for the viewing direction (0,0). Transfer vectors for the remaining viewing directions are obtained by applying a block diagonal matrix to $f_{00}$. In this implementation, rendering module 114 pre-computes the transfer vectors for all (e.g., 98304, etc.) viewing directions.

Exemplary Rendering with Pre-Computed Radiance Transfer

When rendering module 114 applies PRT, rendering module 114 projects both the discretized transfer function and the environment map to Spherical Harmonic (SH) bases, storing only low frequency coefficients. Specifically, in this implementation, the first 16 SH coefficients are stored for both the transfer function and the environment map. In a different implementation, different number of SH coefficients are stored. When shading a pixel in the alpha matte 126, the color C of the pixel is computed as the dot product of the raindrop transfer of the environment map. Since only low frequency SH coefficients are stored, the transfer function contains only a low frequency portion. In particular, the value of transfer function in the viewing direction is reduced a greater amount (as compared to the transfer function in different directions). To compensate for this attenuation, rendering module 114 adds a portion of detected background color B (which is exactly the environment map in the viewing direction) to the rain color as follows:

$$C'=C+cB \qquad (2)$$

In this implementation, c is set to 0.7, although other values could be used. Rendering module 114 uses GPU 106 to alpha-blend the corrected rain color with the background, producing a final rain matted scene (frame) 118, as follows:

$$\tilde{C}=\alpha C'+(1-\alpha)B,$$

where α is an alpha value 126 of a pixel in the alpha matte 126. Using PRT, the effect of the environment map on the rain is realistically achieved.

In this implementation, rendering module 114 leverages alpha-blending operations of GPU 106 to blend rain stroke orientation and colors of each raindrop represented by a particle 122 with a corresponding background using the computed intensity and the alpha matte 126 to generate a rain matted background (shown as a respective portion of "other program data" 124). This appearance is represented by respective ones of the input alpha matte 126, the particle 120 associated shaded rain mask, and detected scene background (shown as a respective portion of "other program data" 124). In one implementation, if rough geometry of the scene is known, rendering module 114 automatically clips the raindrop associated with particle 122 at the scene surface. The scene surface is defined using a mesh of a synthetic scene or the depth map of video content. The clipping gives a volumetric appearance of rain. Which rain shows up in which part of the frame is determined by the scene geometry; determined after computing scene depth or by manual assignment.

An Exemplary Procedure

Figure 4:
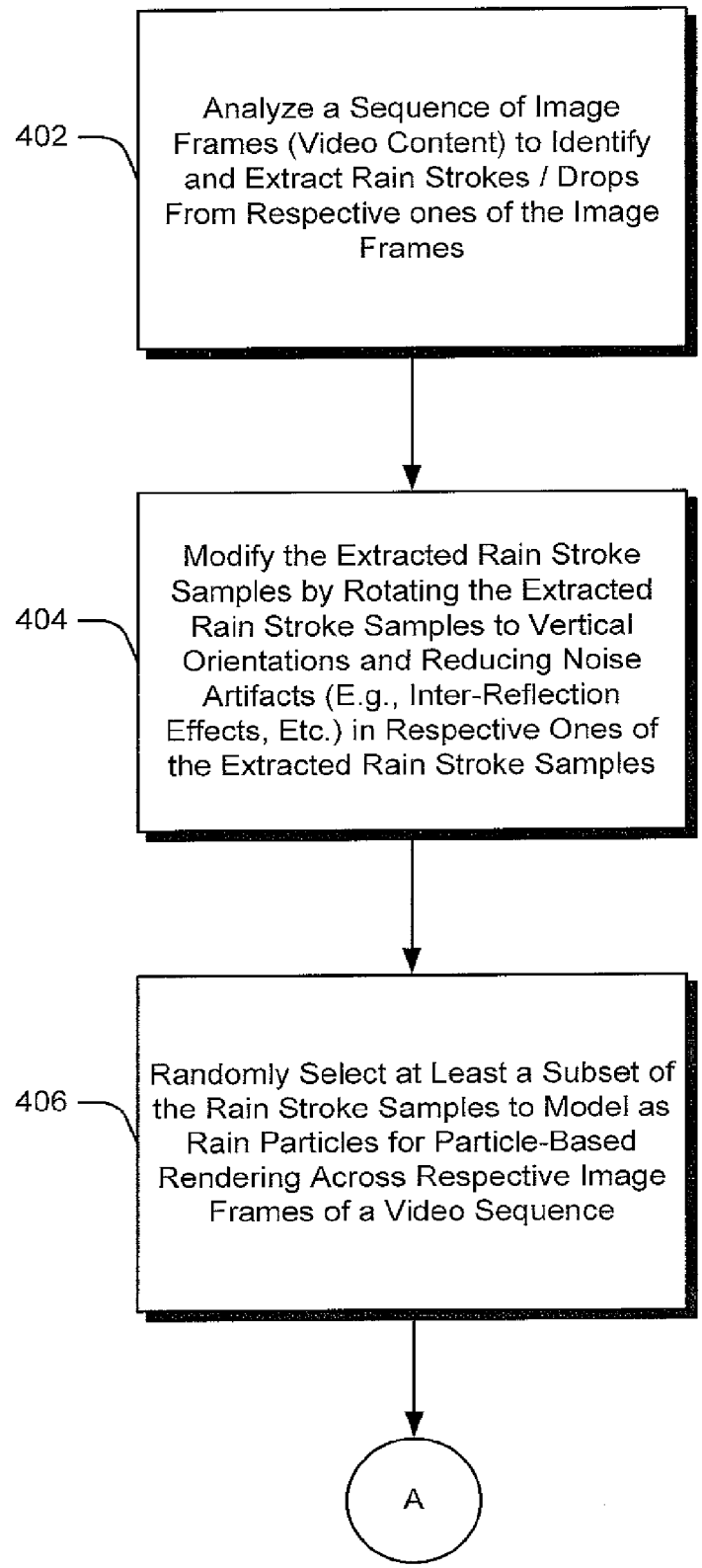
FIG. 4 shows an exemplary procedure for real-time rendering of realistic rain, according to one embodiment.

FIG. 4 shows an exemplary procedure 400 for real-time rendering of realistic rain, according to one embodiment. For purposes of discussion, the operations of FIG. 4 are described in reference to components and data of FIG. 1. In this description, the left-most digit of a component/data reference number identifies the particular figure in which the component/data first appears. Additionally, although the operations of FIG. 4 are shown and described in a certain order, the operations of one block do not necessarily come before or after the operations of a greater or lower numbered block.

Referring to FIG. 4, operations of block 402 analyze a sequence of image frames (video content illustrating real rain) to identify and extract rain stroke samples 120 from respected ones of the image frames. To facilitate adding mattes associated with the rain samples to image frames as synthetic rain that has been customized to attributes of the frame, operations of block 404 modify the extracted rain strokes samples 120 by rotating the extracted rain strokes samples 120 to the desired orientations. The operations of block 404 also include, for example, reduction of noise artifacts such as inter-reflection effects, etc., in respective ones of rain stroke samples 120. Operations of block 406 randomly selected at least a subset of the rain stroke samples 120 to model as rain particles for particle-based rendering across respective image frames of a select video sequence. Operations of procedure 400 continue at on-page reference "A" as shown in FIG. 5.

In this implementation, operations of block 402 through block 404 are performed offline (e.g., not in real-time). Although these operations have been described as being implemented by rendering module 114, in another implementation, these operations are performed by a separate program module 110 that is independent of the real-time synthesis and rendering operations of rendering module 114.

Figure 5:
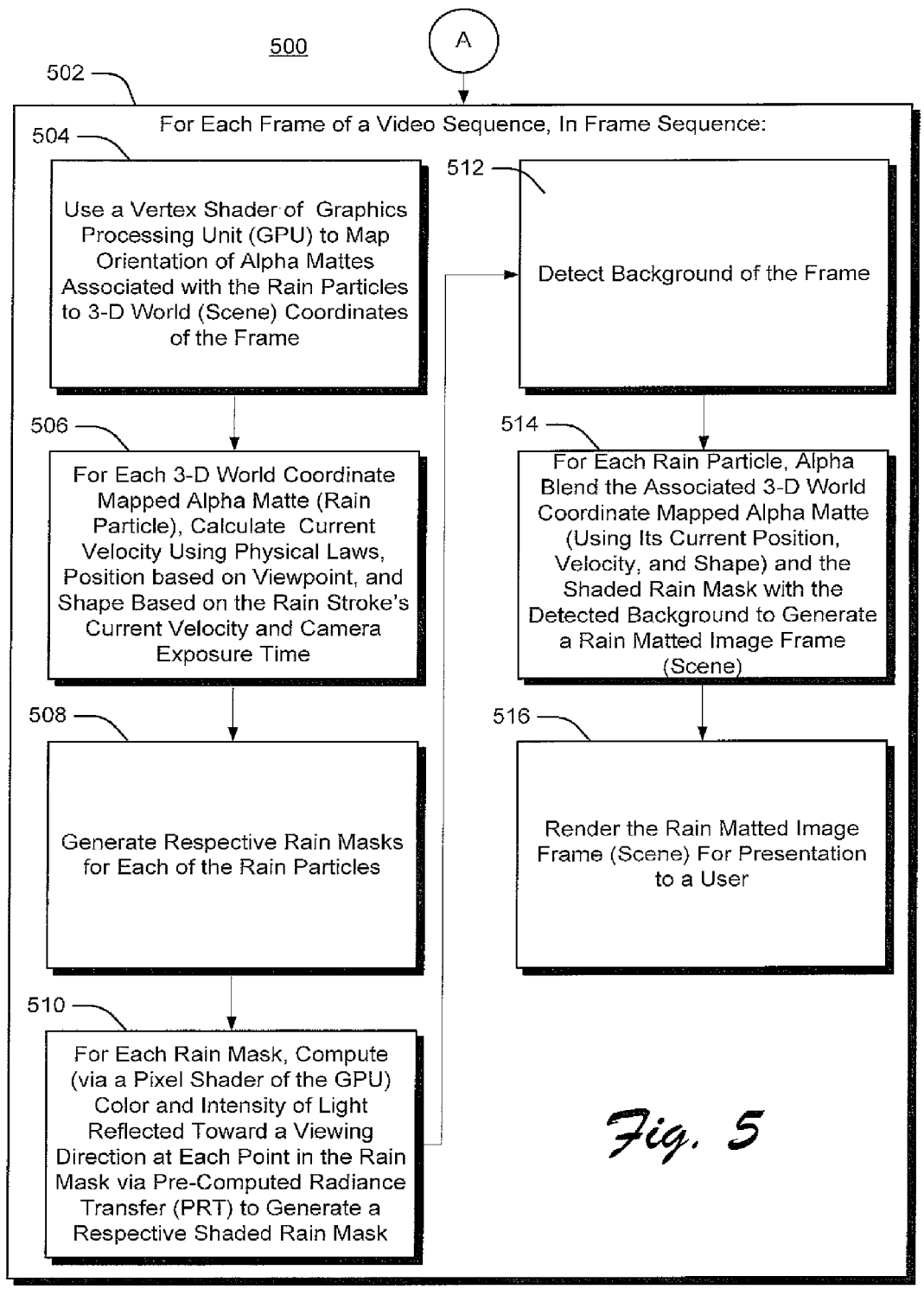
FIG. 5 shows further aspects of the exemplary procedure of FIG. 4 for real-time rendering of realistic rain, according to one embodiment.

FIG. 5 shows further exemplary aspects of the procedure 400 for real-time rendering of realistic rain of FIG. 4, according to one embodiment. Referring to FIG. 5, the operations of procedure 400 began at on-page reference "A", which references block 502. Operations of block 502 are performed for each frame of the video sequence to which synthetic rain is to be added, and they are performed in frame sequence. Operations of block 502 include operations 504 through 516. More particularly, operations of block 504 use vertex shader logic of graphics processing unit (GPU) 106 to map orientation of alpha mattes 126 associated with respective ones of the rain particles 122 to 3-D world (scene) coordinates of a current frame. Operations of block 506, for each 3-D world coordinate mapped alpha matte 126, calculates current raindrop (matte 120/126) velocity, raindrop position based on viewpoint, and raindrop shape based on the raindrop's current velocity and configurable camera exposure time. (As a side note, camera exposure time can be different from frames per second, although they are related. For example, if the frame rate of a camera is 30 fps, then capturing a frame requires ⅟₃₀ seconds. However, every frame can be exposed for only ⅟₅₀ second). Operations of block 508 generate respective rain masks for each of the rain particles 122. Operations of block 510, for each rain mask, compute, via a per-pixel shader of GPU 106, color and intensity of light reflected toward a viewing direction at each point in the rain mask using pre-computed radiance transfer (PRT) to generate respective shaded rain masks.

Operations of block 512 detect background of the current frame. Operations of block 514, for each rain particle 122, alpha blend the associated 3-D world coordinate mapped alpha matte 126 (using its current position, velocity, and shape) and the associated shaded rain mask with the detected background to generate a rain matted image frame (scene) 118. Operations of block 516 render the rain matted image frame 118 comprising synthesized rain for presentation to a user.

CONCLUSION

Although real-time rendering of realistic rain has been described in language specific to structural features and/or methodological operations or actions, it is understood that the implementations defined in the appended claims are not necessarily limited to the specific features or actions described. Rather, the specific features and operations discussed above with respect to FIGS. 1-5 are disclosed as exemplary forms of implementing the claimed subject matter.

APPENDICIES

Appendix A

Transmittance and Reflectance of Light

For unpolarized incident light, the reflectance, i.e., the ratio of the reflected power to the incident power, is $$R(\theta_i) = \frac{(1-\rho^2)^2 m^2 + (1+m^2)^2 \rho^2}{[m(1+\rho^2) + \rho(1+m^2)]^2},$$

where $\rho = \eta_t/\eta_i$, $m = \cos\theta_t/\cos\theta_i$, $\eta_i$ and $\eta_t$ are the refractive indices of the medium of incidence and transmission, respectively, and $\theta_i$ and $\theta_t$ are the angles of incidence and refraction, respectively. Please note that the angle $\theta_t$ of refraction is determined by Snell's law: $\eta_i \sin\theta_i = \eta_t \sin\theta_t$. The transmittance, i.e., the ratio of the transmitted power to the incident power, is $T(\theta_i) = 1 - R(\theta_i)$.

In one implementation, system 100 pre-computes transfer vectors for R, G, and B channels separately.

Appendix B

Outgoing Light Intensity after Multiple Reflection

Because the radii of raindrops follow the Marshall-Palmer distribution, the radii of a vast majority of raindrops are less than 1 mm. As a result, system 100 assumes raindrop shape to be a sphere. This assumption leads to an analytically computable outgoing light intensity, even though light is refracted inside the raindrop many times.

Let $I_{in}$ and $dF_{in}$ be the intensity of the incident light and the incident flux, respectively. Without loss of generality, the direction of incident light is (0,0), i.e., it is parallel to the z-axis of the local spherical coordinate of the raindrop. Let $L_n$, $I_n$, and $dF_n$ be the direction, intensity, and infinitesimal flux of outgoing light after the incident light is reflected inside the raindrop (n−1) times, respectively (FIG. 2(*a*)).

Please note that the light path lies in the plane determined by the center of the raindrop and the incident light (e.g., please see FIG. 2(*a*)). The incident light in direction (0,0) can hit different positions of the raindrop, resulting in different incident angle γ. and the azimuth angle φ. of the plane. Therefore, the directions of $L_n$ are parameterized as $(\theta_n, \phi)$ (FIG. 2(*a*)), where $\theta_n$ is derived as follows.

To compute $I_1$, by the definition of reflectance:

$$dF_1 = R(\gamma) dF_{in}, \quad (3)$$

with R(γ) being the reflectance at angle γ. Please note that $$dF_{in} = I_{in} \cos\gamma \cdot d\omega_{in} = I_{in} \cos\gamma \cdot \sin\gamma d\gamma d\phi, \quad (4)$$

$$dF_1 = I_1 d\omega_1 = I_1 \sin\theta_1 d\theta_1 d\phi, \quad (5)$$

where $I_{in}$ is the intensity of the incident light, and $\omega_{in}$ and $\omega_1$ are the infinitesimal solid angles of incident and outgoing light, respectively. As the incident light is in the direction (0,0), $\theta_1 = \pi - 2\gamma$. By combining (3), (4), and (5):

$$I_1 = \frac{1}{4} R(\gamma) I_{in}. \quad (6)$$

To compute $I_n$ (n>1), we consider the light being reflected (n−2) times inside the raindrop and refracted 2 times when leaving the raindrop. Therefore, $$dF_n = [T(\gamma)]^2 [R(\gamma)]^{n-2} dF_{in},$$

where $$dF_n = I_n d\omega_n = I_n \sin\theta_n d\theta_n d\phi.$$

Using the assumption that the raindrop is spherical:

$$\theta_n = \Theta[\pi - 2\gamma - (n-1)(\pi - 2\beta)],$$

where $\Theta(x) = |\text{mod}(x+\pi, 2\pi) - \pi|$ restricts the angle x to be between 0 and π, and β is the refraction angle when the incident light refracts inside the raindrop for the first time (FIG. 2(*a*)). After some algebraic manipulation: $I_n = \xi_n I_{in}$, where $$\xi_n = \frac{[T(\gamma)]^2 [R(\gamma)]^{n-2} \sin(2\gamma)}{4 \left| \sin[2(n-1)\beta - 2\gamma] \left[ \frac{(n-1)\cos\gamma}{\rho\cos\beta} - 1 \right] \right|}.$$

Appendix C

Outgoing Light Intensity Distribution Function

In the previous section, scattering directions $(\theta_n, \phi)$ and the corresponding attenuation coefficients $\xi_n$ were derived, given the incident angle γ and azimuth angle φ of the incident light. Note that the incident light in direction (0,0) can hit any point on a raindrop (FIG. 2(*b*)). So, the intensity of light reflecting toward direction $(\theta_n, \phi)$, in the local spherical coordinate of the raindrop with the viewing direction being along the z-axis, is $$I_S(\theta, \phi) = \sum_{n=1}^{\infty} \sum_{\theta_n(\gamma)=\theta} I_n(\gamma).$$

Thus, the outgoing light intensity distribution function is $$D(\theta, \phi) = \frac{1}{\pi I_{in}} I_S(\theta, \phi) = \frac{1}{\pi} \sum_{n=1}^{\infty} \sum_{\theta_n(\gamma)=\theta} \xi_n(\gamma), \quad (7)$$

where $\xi_1(\gamma) = R(\gamma)/4$ due to (6). The denominator $\pi I_{in}$ is used for normalization, since it is the value of the integral of $I_s$ over all directions. To make the computation more efficient, rendering module 114 pre-computes an inverse table of γ's that satisfies $\theta_n(\gamma) = \theta$. $\xi_n$ usually drops rapidly with increasing n. Empirically, the first nine $\xi_n$'s hold about 99.8% of the full power; as a result, only $\xi_1, \ldots, \xi_9$ are used in this implementation, although different number of $\xi_n$'s could be used in a different implementation.

The invention claimed is:

1. A computer-implemented method comprising:
analyzing, static image frames of video content depicting real rain to identify various sizes and shapes of real rain;
automatically modeling, in real-time, images of real rain and associated information to generate synthetic rain particles, wherein the images and associated information are automatically modeled for blending with respective ones of multiple frames of image content, and wherein automatically modeling further comprises:
for each frame of the multiple frames and for each sample raindrop represented by at least a subset of the images:
generating a rain mask for the sample raindrop, the rain mask identifying portion(s) of the frame that will be shaded by the sample raindrop, the rain mask being generated from alpha values defining opacity of the sample raindrop, the alpha values having been modeled to 3-D coordinate space of the frame;
creating a shaded rain mask from the rain mask to specify color and intensity distribution of the sample raindrop, wherein creating the shaded rain mask further comprises determining the color and intensity distribution based on pre-computed radiance transfer values and a transfer function of a sphere model of the sample raindrop, the sphere model having a refractive index of water; and
rendering, in real-time, the synthetic rain particles across respective frames of video content.

2. The method of claim 1, wherein the images and associated information is automatically modeled for blending with multiple frames of image content, and wherein automatically modeling further comprises:
for each frame of the multiple frames and for each image of at least a subset of the images and associated information:
determining a current velocity of a raindrop represented by the image based on a previous velocity of the raindrop;
computing shape of the raindrop based on the current velocity and camera exposure time; and
calculating position and orientation attributes of the raindrop based on 3-D coordinate space of the frame, current velocity, and a uniform random distribution criteria.

3. The method of claim 1, wherein a graphics processing unit (GPU) generates the rain mask, and wherein per-pixel shader logic of the GPU creates the shaded rain mask.

4. The method of claim 1, wherein the transfer function is based on the reversibility of light.

5. The method of claim 1, wherein rendering the synthetic rain particles further comprises blending an alpha matte with the shaded rain mask and detected background color of the frame to generate a synthetic rain matted frame, the alpha matte having current velocity, shape, position, orientation, and color and intensity distribution attributes, the synthetic rain matted frame being a particular one of the respective frames of video content.

6. The method of claim 1, wherein the method further comprises randomly selecting the images of the real rain from a library of images of real rain and corresponding information.

7. The method of claim 1, wherein the method further comprises
extracting attributes associated with identified real rain from respective ones of the static image frames to generate at least the images and the associated information; wherein the attributes comprise at least a rain stroke matte including alpha and radiance values, rain stroke direction, and detected background color, the alpha values defining opacity characteristics.

8. The method of claim 7, wherein analyzing the video content and extracting the information is implemented offline.

9. The method of claim 7, wherein the method further comprises:
rotating the rain stroke matte to a vertical orientation; and
removing noise from the rain stroke matte.

10. A computer-readable storage medium comprising computer-program instructions executable by a processor, the computer-program instructions, when executed by the processor for:
creating a set of rain particles from a set of randomly selected rain stroke samples and associated information, the rain stroke samples being randomly selected from a library of extracted rain stroke samples;
rendering, in real time, synthetic rain across multiple frames of video content, the synthetic rain being based on respective ones of the rain particles, the rendering comprising:
for each frame of the frames, and for each particle of at least a subset of the rain particles:
computing, using a graphics processing unit (GPU), velocity, 3-D position, orientation, and shape of an alpha matte associated with the particle;
determining, using the GPU, a set of pixels to shade from the alpha matte;
calculating a shaded rain mask, using per-pixel shader operations of the GPU in view of the pixels to shade, to specify the color and intensity distribution of pixels using pre-computed radiance transfer values and a transfer function of a sphere model associated with each rain particle, the sphere model having a refractive index of water; and blending, using the GPU, the alpha matte and a background color associated with the frame with the shaded rain mask
based on the color and the intensity distribution of the pixels to generated a synthetic rain matted frame for presentation to a user.

11. The computer-readable storage medium of claim 10, wherein the library of extracted rain stroke samples is generated offline, and wherein at least the rendering is performed in real-time.

12. The computer-readable storage medium of claim 10, wherein the 3-D position is uniformly randomly distributed in space delineated by the frame.

13. The computer-readable storage medium of claim 10, wherein the shape comprises a length and a diameter, the length being interpolated based on a current velocity of the particle and an exposure time of a virtual camera, the diameter corresponding to width of the alpha matte after being mapped to scene coordinates of the frame.

14. The computer-readable storage medium of claim 10, wherein operations associated with the pre-computed radiance transfer are based on an outgoing light intensity distribution transfer function.

15. The computer-readable storage medium of claim 10, wherein computer-program instructions further comprise instructions for providing volumetric appearance of synthetic rain by:
identifying rough geometry of a scene associated with the frame; and
automatically clipping the alpha matte at surface of the scene prior to the rendering, the surface being defined using a mesh of a synthetic scene or a depth map.

16. The computer-readable storage medium of claim 10, wherein computer-program instructions further comprise instructions for:

analyzing static image frames of video content depicting real rain to identify various sizes and shapes of the real rain;

extracting rain stroke mattes and information associated with identified real rain from the identifies various sizes and shapes of the real rain; and wherein the rain stroke mattes and the information represent the library of extracted rain stroke samples.

17. A computer comprising:

a processor; and a memory coupled to the processor, the memory comprising computer-program instructions executable by the processor for:

randomly selecting static real rain stroke samples from video content;

modeling, in real time using a graphics accelerator, the static real rain stroke samples as synthetic rain particles in view of respective scene radiances, wherein modeling the static real rain stroke samples as synthetic rain particles further comprises:

converting rain stroke mattes into 3-D coordinate space of respective image frames of video content;

calculating velocity, position, and shape attributes of alpha mattes associates with the rain stroke mattes based on previous values, physical laws, and rain stroke distribution criteria;

identifying respective rain masks from the alpha masks;

using pre-computed radiance transfer values and a transfer function of a sphere model associated with each rain particle, the sphere model having a refractive index of water, to identify pixel color and intensity distributions from the rain masks; and wherein rendering further comprises alpha blending the alpha masks with information associated with identified pixel color and intensity distributions and detected frame background color to create synthetic rain matted scenes for presentation to a user; and rendering the synthetic rain across scenes with uniform random distribution, controllable velocity, and color determined via pre-computed radiance transfer.

* * * * *